United States Patent
Bischofberger

(10) Patent No.: US 6,546,922 B1
(45) Date of Patent: Apr. 15, 2003

(54) PISTON ENGINE WITH LIGHT-ALLOY CYLINDER

(75) Inventor: Ulrich Bischofberger, Esslingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/018,505

(22) PCT Filed: Mar. 21, 2000

(86) PCT No.: PCT/DE00/00920
§ 371 (c)(1),
(2), (4) Date: Oct. 29, 2001

(87) PCT Pub. No.: WO00/66918
PCT Pub. Date: Nov. 9, 2000

(30) Foreign Application Priority Data

Apr. 30, 1999 (DE) .......................................... 199 19 725

(51) Int. Cl.⁷ ................................................. F02B 75/08
(52) U.S. Cl. ..................................... 123/668; 123/193.4
(58) Field of Search ............................. 123/668, 193.6, 123/193.4

(56) References Cited

FOREIGN PATENT DOCUMENTS

| | | |
|---|---|---|
| CH | 400 670 | 4/1966 |
| DE | 26 55 712 | 6/1978 |
| DE | 30 47 978 | 7/1982 |
| DE | 91 06 748 | 4/1992 |
| DE | 41 33 546 | 5/1993 |
| DE | 42 40 050 | 6/1994 |
| DE | 43 10 491 | 10/1994 |
| DE | 44 29 489 | 2/1996 |
| GB | 2 129 523 | 5/1984 |
| JP | 55-125343 | * 9/1980 |
| JP | 01112079 | 4/1989 |
| JP | 03265761 | 11/1991 |

* cited by examiner

*Primary Examiner*—Noah P. Kamen
(74) *Attorney, Agent, or Firm*—Collard&Roe, P.C.

(57) ABSTRACT

The invention aims to improve the seizure resistance of a piston engine with a light-alloy cylinder having a chrome-plated friction surface. To this end the friction surface of the piston is provided with a coating on the basis of artificial resin in which hard particles are embedded.

4 Claims, 1 Drawing Sheet

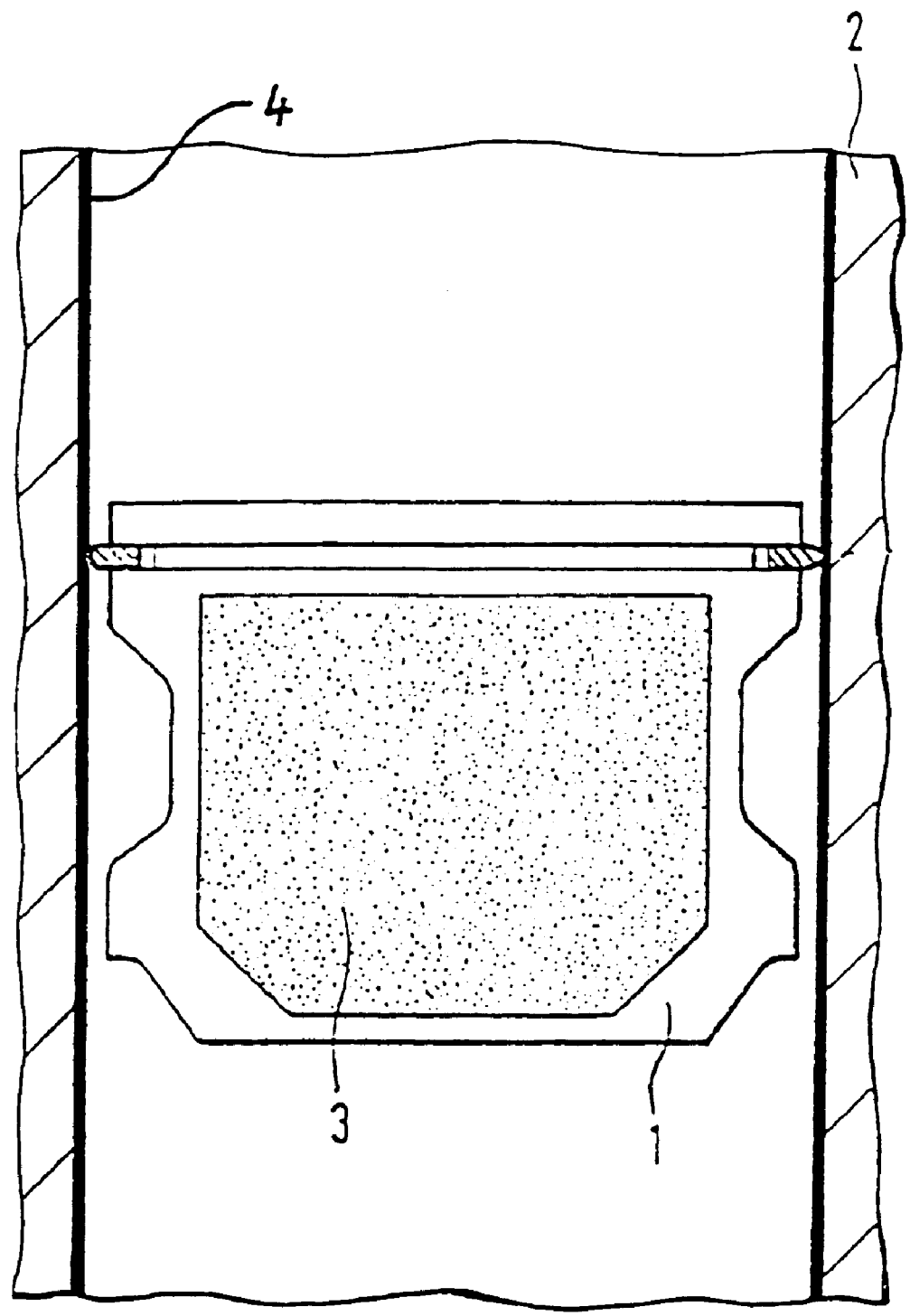

PISTON ENGINE WITH LIGHT-ALLOY CYLINDER

CROSS REFERENCE TO RELATED APPLICATIONS

Applicants claim priority under 35 U.S.C. §119 of GERMAN Application No. 199 19 725.3 filed on Apr. 30, 1999. Applicants also claim priority under 35 U.S.C. §120 of PCT/DE00/00920 filed on Mar. 21, 2000. The international application under PCT article 21(2) was not published in English.

The invention relates to a piston engine comprising at least one piston and at least one cylinder made of light alloy and having a chrome-plated running friction surface.

Such piston engines are known, for example from the auto magazine article "Weitere Fortschritte mit verchromten Leichtmetallzylindern" [Further Progress made with chrome-plated light-alloy cylinders] by Dr. E. Mahle published in Motorzeitung (MZT), Year 1953, page 63.

It has been found recently that such a pairing of the running friction surface of pistons in the development of engines designed accordingly in the direction of higher power outputs, which are frequently employed in mopeds, lawnmowers or saws, are no longer adequately safe with respect to resistance to seizure. It was found that the cause of this are increased lateral forces and a transfer of material from the chrome-plated running surface of the cylinder into the micro-range of uncoated pistons resulting from such forces.

As a remedy, provision has been made first for a synthetic resin-graphite coating of the running surface. However, such a coating showed increased wear as compared to the use of conventional running surface pairings.

It has been admittedly possible to substantially reduce such wear by minimizing the roughness of the chromium coating; however, said measure also leads to burnt piston rings.

The invention, therefore, is dealing with the problem of reducing in connection with piston engines comprising at least one cylinder made of light alloy and having a chrome-plated running surface the tendency to seizure occurring between the piston and the cylinder.

Said problem is solved by the characterizing feature of claim 1. Advantageous further developments of the invention are the objects of the dependent claims.

The desired effect has been achieved solely by the use of synthetic resin coatings as defined by the invention, which contain hard particles incorporated in the coating. This is ascribed to the fact that the coating as defined by the invention creates quasi by itself a favorable counter running surface by means of the embedded hard particles in that the chromium layer is "ground". Even small amounts of hard particles, for example about 5 percent by weight, preferably less than 3 percent by weight suffice for obtaining the effect as defined by the invention. Even a component amounting to only 1% can produce the desired effect in most cases. The preferred mean diameter of the hard particles comes to 3 to 7 $\mu$m.

The coating is produced by screen printing, ink ball printing or by spraying.

It is known per se from DE 3047978 A to coat the running surface of a piston and/or of a cylinder for special piston compressors with a lacquer produced on the basis of epoxy resin with an oxide-ceramic material added to said epoxy resin. However, said coating has been disclosed exclusively as an alternative to the known iron, chromium or nickel coatings, which are described as being relatively costly and to some extent difficult to produce in terms of processing technology. It is finally stated in said cited reference that only one of the two friction partners is coated, and that the piston offers itself on account of the lower work expenditure.

The invention is explained in greater detail in the following with the help of an exemplified embodiment. In the drawing, FIG. 1 shows a piston engine as defined by the invention.

A piston 1 made of an aluminum alloy is installed in a cylinder 2 made of an aluminum alloy. The running surface of said cylinder is coated with a chromium layer 4. The piston itself is coated on its running surface with a synthetic resin layer 3 with incorporated hard material particles consisting of $Al_2O_3$. The piston is connected with a crankshaft not shown via a piston rod not shown.

I claim:

1. A piston engine comprising at least one piston (1) and at least one cylinder (2) made of light alloy and having a chrome-plated running surface, characterized in that the running surface of the piston (1) at least partially comprises a coating (3) based on synthetic resin with incorporated hard particles with an average particle diameter of 10 $\mu$m at the most.

2. The piston engine according to claim 1, characterized in that the hard particles consist of $Al_2O_3$, SiC, $Si_3N_4$, TiC or WC.

3. The piston engine according to claim 1, characterized in that graphite or $MoS_2$ is contained in the coating for enhancing the sliding properties.

4. The piston engine according to claim 1, characterized in that the component of hard particles incorporated in the coating (3) amounts to less than 5% by weight.

* * * * *